Oct. 11, 1960 EIICHI GOTO 2,956,173

GATING SYSTEM FOR A DIGITAL COMPUTING DEVICE

Filed Sept. 24, 1956 4 Sheets-Sheet 1

GATING SYSTEM FOR A DIGITAL COMPUTING DEVICE
Filed Sept. 24, 1956 4 Sheets-Sheet 4
Fig-5
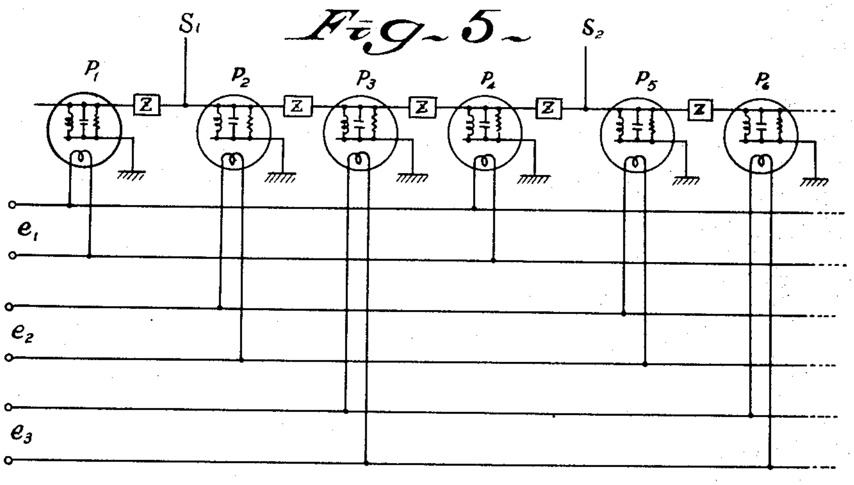
Fig-6A Fig-6B
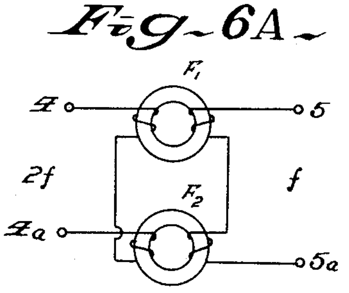
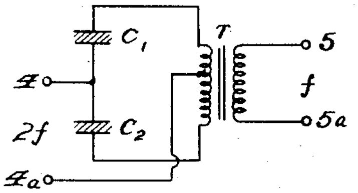
Fig-8
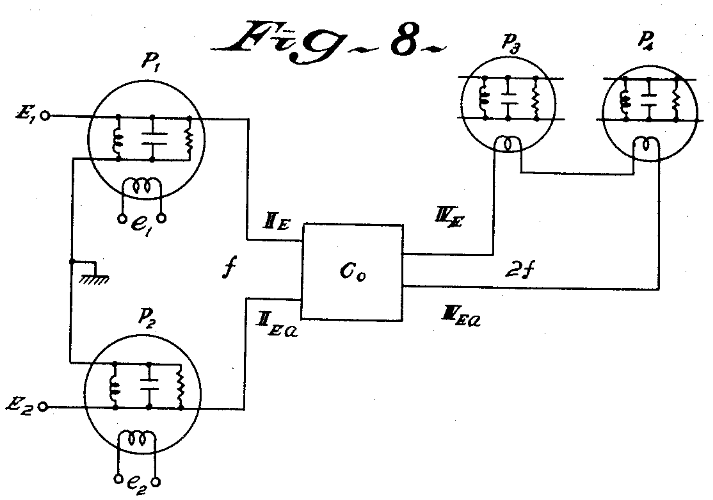

United States Patent Office 2,956,173

Patented Oct. 11, 1960

2,956,173

GATING SYSTEM FOR A DIGITAL COMPUTING DEVICE

Eiichi Goto, Nakameguro, Meguro-ku, Tokyo-to, Japan, assignor to Kokusai Denshin Denwa Kabushiki Kaisha, Tokyo-to, Japan Filed Sept. 24, 1956, Ser. No. 611,563

Claims priority, application Japan Sept. 27, 1955

10 Claims. (Cl. 307—88)

This invention relates to a gating system for the control of transmission of digital signal in a digital computing device comprising parametrically excited resonators.

Such parametrically excited resonators have been disclosed in the U. S. patent applications Ser. Nos. 508,668 filed on May 16, 1955; 579,572 filed on April 20, 1956; 579,573 filed on April 20, 1956; 585,043 filed on May 15, 1956; and 604,241 filed on August 15, 1956.

An oscillation can be produced in a resonance circuit by varying the resonance frequency of said resonance circuit with an exciting wave having a frequency about twice as much as the resonance frequency of said resonance circuit. This phenomenon is called "parametric excitation of oscillation," and the resonance circuit is caller a "parametrically excited resonator." Hereinafter, the parametrically excited resonator will be called "parametron."

The oscillation phase of a parametron can be either one of the two phases which are different by 180°, for example, 0 radian and $\pi$ radian. Accordingly, when a weak alternating current having a frequency equal to the oscillation frequency of the parametron is applied to the resonance circuit of the parametron at the same time as or slightly prior to the application of exciting alternating current, the oscillation phase of said parametron is controlled to either one of 0 radian or $\pi$ radian in accordance with the phase of said weak alternating current.

Electric computers, electric communication apparatuses and electric controllers, in which parametrically excited resonators as described above are utilized as their circuit elements have been proposed by the same inventor (ref.: the above-mentioned patent applications), the principle of said electric apparatus being described in detail later.

A principal object of this invention is to reduce the number of circuit elements to be used for channel selecting circuits and shift register circuits which compose the digital computing device so as to economize on the manufacturing cost of the device.

Other objects of this invention have been accomplished by carrying out selective transmission of digital signals through parametrons by controlling the oscillation of said parametrons with a gating signal.

The construction and operation, together with other objects and advantages of this invention may best be understood by reference to the following description, taken in conjunction with the accompanying drawings, in which:

Fig. 5 is a circuit diagram illustrating another embodiment of this invention.

Fig. 6A is a circuit diagram of one embodiment of the gate circuit to be used for the system of this invention.

Fig. 6B is a circuit diagram of another embodiment of the gate circuit to be used for the system of this invention.

Fig. 8 is a control circuit diagram of an example of this invention.

First of all, the oscillation principle and the characteristics of the parametrons will be described.

Figure 1A:
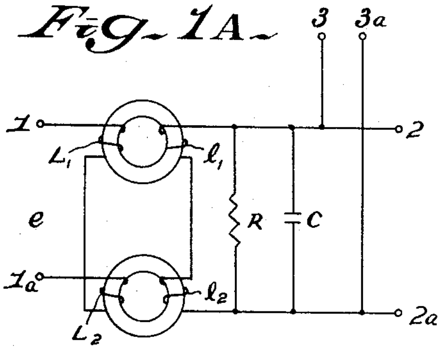
Fig. 1A is a connection diagram illustrating one embodiment of the parametron.

Fig. 1A shows a parametron having ferro-magnetic cores. The parametron comprises ferro-magnetic cores $F_1$ and $F_2$. Each of said cores, $F_1$ and $F_2$, is provided with a primary coil, $L_1$ or $L_2$, and a secondary coil, $l_1$ or $l_2$, and said primary and secondary coils are connected respectively in series. Either one pair of said primary or secondary coils, for example the primary coils, is connected in inverse phase so that a secondary output having a frequency equal to that of the exciting current supplied from the exciting terminals 1 and 1*a* (terminal pair *e*) may be eliminated. A condenser C is connected in parallel with the secondary terminals 2 and 2*a* to form a resonance circuit.

A resistor R connected in parallel with the condenser C is used as a damping resistance.

When an exciting current having about twice the resonance frequency of the resonance circuit (secondary circuit) of the parametron is supplied to the exciting terminals 1 and 1*a*, together with a direct current superposed thereon, the resonance frequency of the resonance circuit varies at the frequency of said exciting current, an oscillation wave having one half the frequency of said exciting frequency (½ subharmonic frequency) is generated in said resonance circuit, and said wave can be taken out from the output terminals 2 and 2*a*, phase of said output wave being either one of the two phases which differ by 180°. In Fig. 1A, since the secondary windings $l_1$ and $l_2$, wound on two ferromagnetic cores and the primary windings $L_1$ and $L_2$ wound on the same two cores, are in a balanced configuration and said secondary windings $l_1$ and $l_2$ are so connected to the output terminals (2 and 2*a*) as to cancel each other's induced voltage a voltage would not appear between said output terminals even when an electric current is applied to the exciting terminals 1 and 1*a* connected to the primary windings $L_1$ and $L_2$. However, since the permeability of the ferromagnetic core is made to vary by said current, the resonance frequency of the resonant circuit connected to the terminals 2 and 2*a* varies.

Figure 3:
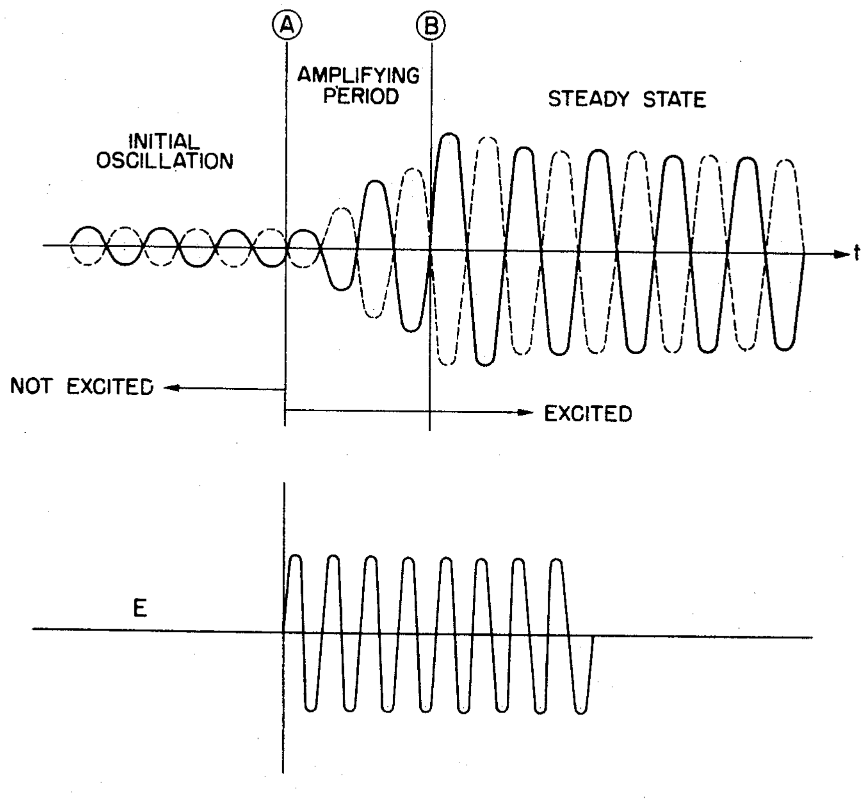
Fig. 3 is wave forms for describing the operations of the parametron.

Now, let it be assumed that the resonant circuit connected to the output terminals 2 and 2*a* is in a resonant state with a frequency and a weak resonant current I*f* having a frequency *f* exists in said circuit. In this state, when an exciting current having a frequency 2*f* is applied to the exciting terminals 1 and 1*a*, a voltage having the beat frequency of the two frequencies 2*f* and *f* is induced in said resonant circuit due to cross modulation. As said beat frequency is equal to (2*f*—*f*) and accordingly, equal to the frequency *f* of said weak resonant current. Accordingly, if the phase of said beat voltage corresponds to the positive feed back direction capable of strengthening the weak resonant current, then the resonant current increases suddenly, thereby an oscillation having frequency *f* (½ subharmonic of the exciting current having frequency 2*f*) is generated in the resonant circuit. Moreover, said positive feed back is most effective in two phase which are different by 180° from each other. Accordingly, as the oscillation having either one of the above mentioned two phases is generated in the resonant circuit of the parametron represents "1" and "0" of a binary digit. The phase of the oscillation output wave is, as described above, determined by the phase of a weak control wave which is supplied from the control terminals, 3 and 3*a*, and which has a frequency equal to the oscillating frequency of the parametron. Fig. 3 shows the above mentioned fact. Two kinds of voltages at the output terminals 2 and 2*a* of Fig. 1*a* are shown in Fig. 3, in which the solid line represents the oscillation having the frequency *f* and a phase of 0° and the dotted line represents the oscillation having the phase of 180°. When an exciting current is applied to the exciting terminals (1 and 1*a*) of Fig. 1 at the time Ⓐ, the initial oscillation of small amplitude increases suddenly during the period between the times Ⓐ and Ⓑ and then assumes a steady state. The phase of said steady state oscillation, as will be understood from Fig. 1A, can be controlled by the phase of the weak initial oscillation and this control can be achieved for each restart of the parametron oscillation after interruption of said oscillation.

The phase control signal of the parametron is applied to the circuit from the terminals 3 and 3*a* as shown in Fig. 1A. This signal causes the initial oscillation so as to control the oscillation of the steady state. When the oscillation of the parametron becomes a steady state condition once the phase and amplitude of the oscillation of steady state are not varied even when the phase control signal applied to the terminals 3 and 3*a* is cut off or the phase of said signal is inverted. Accordingly, the next control is carried out after interruption of the oscillation. The steady state oscillation of the parametron is taken out as an output from the terminals 2 and 2*a* and then used as the phase control signal of the parametron of a next stage.

The signal of the parametron is not a pulse and is a sinusoidal wave having a phase modulation of 180°. Accordingly, the parametron does not operate by the signal of one cycle and ordinarily operates by application of a control signal of 3–10 cycles.

Figure 1C:
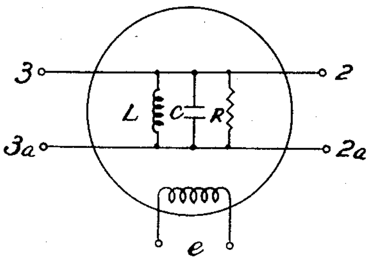
Fig. 1C is a symbolized connection diagram of the parametron illustrated in Fig. 1A.
Figure 1B:
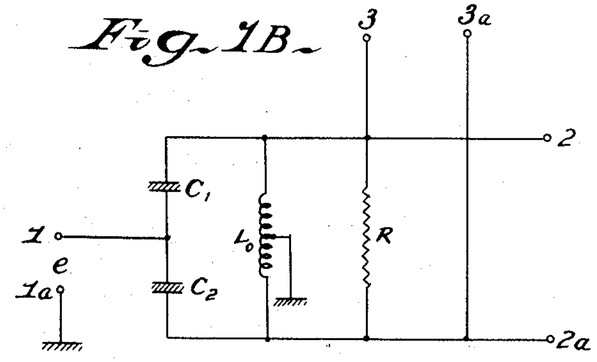
Fig. 1B is a connection diagram illustrating another embodiment of the parametron.

In the parametron illustrated in Fig. 1B, the resonance circuit consists of nonlinear capacitors $C_1$ and $C_2$ and an inductance coil $L_0$. In the parametron in Fig. 1B, the same parts as those of the parametron in Fig. 1A are indicated by the same numerals and letters. In this parametron also, an oscillation output wave having one half the frequency of the exciting frequency of the parametron can be taken out from the output terminals 2 and 2*a* when the exciting terminals 1 and 1*a* are supplied with an exciting current having a frequency about twice the frequency of the resonance frequency of the parametron, together with a D.C. voltage superposed thereon.

The oscillation principle and other characteristics of the parametron illustrated in Fig. 1B are quite similar to those of the parametron illustrated in Fig. 1A, so that the principle and embodiments of this invention will be described hereinafter in connection with only the parametron in Fig. 1A.

As described above, the parametron has a property that the phase of oscillation output wave thereof is either one of two phases which differ by 180°, for instance 0 and $\pi$ radians, when the parametron is supplied with a weak phase control current. Therefore, the binary digits "0" and "1," can be represented by the two oscillation phases, 0 and $\pi$, of the parametron. Consequently, it is possible to manufacture a logical operation circuit or a signal delaying circuit by suitable combination and connection of the parametrons.

In the symbolized connection diagram in Fig. 1C, the inductance of the resonance circuit and exciting terminals are, respectively, represented by L and *e*, and capacitor, damping resistance, output terminals, and control terminals are indicated by the same numerals and letters as those of the parametron in Fig. 1A. In the following description, the parametrons are indicated by such symbolized diagram as shown in Fig. 1C.

Figure 2:
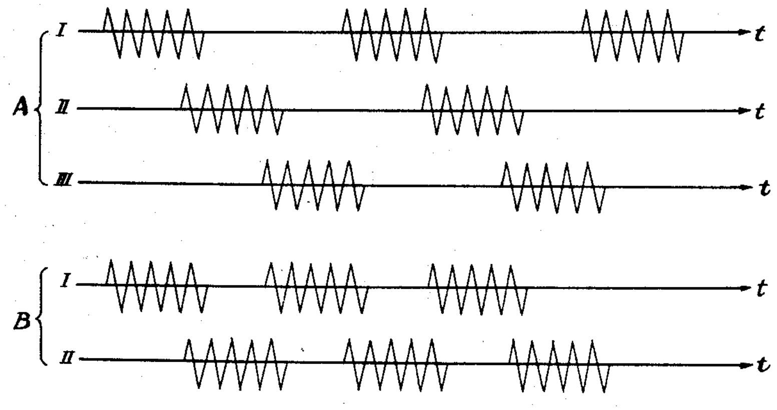
Fig. 2A is one embodiment of the exciting waves of the parametron.
Fig. 2B is another embodiment of the exciting waves of the parametron.

For the purpose of exciting the digital computing device comprising parametrons, the inventor disclosed an exciting system in which three kinds of slightly overlapping exciting currents I, II and III such as shown in Fig. 2A are, respectively, supplied to three groups of the parametrons. (Ref.: the above-mentioned patent applications.)

Such an exciting system will be described hereunder as "stationary exciting system" of three beats.

However, when parametrons are coupled by a suitable directional coupling device (ref.: U.S. patent application Ser. No. 604,241, filed on August 15, 1956), the parametrons are grouped into two groups and these groups are, respectively, supplied with two slightly overlapping exciting current I and II such as shown in Fig. 2B. Such an exciting system will be described hereunder as a "stationary exciting system" of two beats.

Generally, it is possible to use *n* (a positive integer) kinds of slightly overlapping exciting currents. Therefore, the abovementioned exciting system is generally denoted as a "stationary exciting system" of *n* beats. In the above exciting system, starting and stopping of the oscillation of the parametron are successively carried out without regard to the oscillation phase of any parametron or to the variation of input signal of the computing device.

The gating system of this invention relates to a basic system for controlling the oscillation of gate parametrons by a gating signal. This system is entirely different from the above-mentioned stationary exciting system and will be called "a stationary exciting system."

Hereunder, the principle of this invention will be described.

When such a particular control wave D having a frequency *f* as shown in Fig. 3 is applied to the control terminals of a parametron while supplying the exciting terminals of the parametron with such an exciting wave E having a frequency 2*f* as shown in Fig. 3, the amplitude of the control wave D increases rapidly, whereby the oscillation output wave G having a large amplitude can be taken out from the output terminals of the parametron. On the other hand, when the exciting wave E is not supplied, or more generally when the oscillation of the parametron is suppressed by suitable means, the oscillation output wave is not generated. Such a property of parametrons as described above means that a parametron can perform a gating action when the oscillation of said parametron is controlled by a gating signal.

While such a gating action is not utilized in the stationary exciting system, said action is just the basic idea of this invention.

Figure 4:
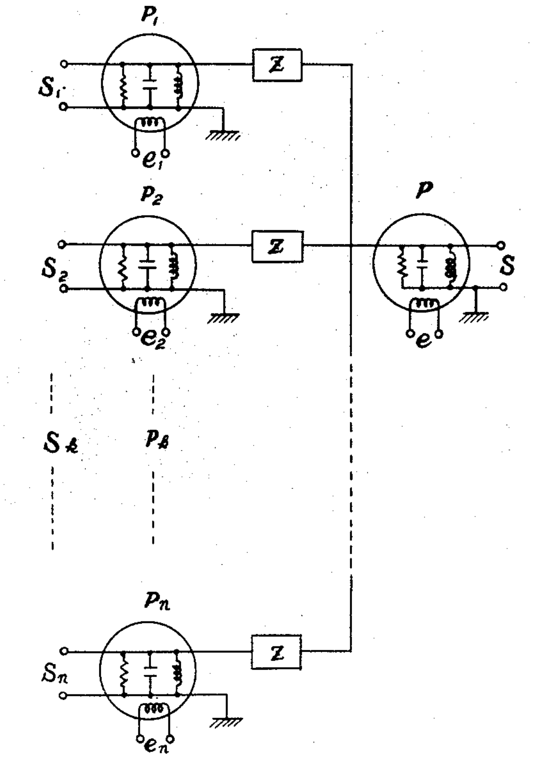
Fig. 4 is a circuit diagram illustrating one embodiment of this invention.

In Fig. 4 is shown a selection circuit in which the abovementioned gating action is utilized. In the circuit of Fig. 4, a plurality of gate parametrons, $P_1, P_2 \ldots P_k \ldots P_n$, having, respectively, input terminal pairs, $S_1, S_2 \ldots S_k \ldots S_n$, are coupled with an output parametron P having an output terminal pair S through coupling impedance Z.

Now, let it be assumed that each of the input terminal pairs $S_1 \ldots S_n$ has been supplied with input binary signals. In this case, when it is desired to transmit selectively one binary digital signal out of many input signals, for example the input signal of the input terminal pair $S_k$, to the output parametron P, only the gate parametron $P_k$ is made to oscillate by means of the gating signal thereof, whereby only the parametron $P_k$ oscillates and the output thereof is supplied to the output parametron P through the coupling impedance Z.

Therefore, when the parametron P is made to oscillate by excitation thereof, an output having a phase corresponding to the phase of the signal supplied to the input terminal pair $S_k$ of the gate parametron $P_k$ can be taken out from the output terminal pair S.

On the contrary, when the terminal pair S is used as the only input terminals of a digital signal and only the terminal pairs, $S_1 \ldots S_n$, are used as output terminal pairs of the digital signal and when it is desired to take out output signals from the parametrons of any number, for example from three terminal pairs $S_1$, $S_2$ and $S_k$, the parametron P is made to oscillate first and then the gate parametrons, $P_1$, $P_2$ and $P_k$ are made to oscillate by their gating signals, whereby output signals can be taken out selectively from the terminal pairs, $S_1$, $S_2$ and $S_k$.

Moreover, the circuit of Fig. 4 can be used as a channel selector which connects the selected two terminal pairs.

For instance, when it is desired to connect the two terminal pairs $S_1$ and $S_k$, only the two parametrons, $P_1$ and $P_k$, are made to oscillate by the gating signals thereof, and the direction of signal transmission is determined by the order of sequence of the said gating signals.

As will be clearly understood from the above description, the circuit of Fig. 4 can be used for the two purposes, one for selectively taking out one signal wave out of many signal waves and the other for transmitting one signal wave to a selected output terminal pair or pairs among many output terminal pairs. Such a selection circuit can effectively be utilized for electric digital computing circuits such as memory address selectors, shift registers and channel selection circuits.

In Fig. 5 is shown another embodiment of this invention, which relates to a shift register capable of transmitting binary digital signals towards any direction, namely, to right or to left.

The circuit in Fig. 5 consists of a series of gate parametrons, $P_1$, $P_2$, $P_3$, $P_4$, $P_5$ and $P_6$ . . ., connected in series through coupling impedances Z, exciting terminal pairs, $e_1$, $e_2$ and $e_3$, and signal input terminal pairs $S_1$ and $S_2$. When the exciting terminal pairs, $e_1$, $e_2$ and $e_3$, are, respectively, supplied with the exciting waves I, II and III as shown in Fig. 2A, every third parametrons are simultaneously oscillated and control the oscillation phase of their adjacent parametrons on the right. Accordingly, the binary digital signals memorized in the form of 0 radian phase or $\pi$ radian phase, are shifted successively rightwards. On the contrary, when the exciting terminal pairs $e_3$, $e_2$ and $e_1$, are, respectively, supplied with the exciting waves, I, II and III, by reversing the sequence of three kinds of gating signals, the binary digital signals are shifted successively leftwards. Stopping of said shifting of the binary digital signals may be carried out by exciting the parametrons with a continuous wave having a constant amplitude without use of any intermittent exciting wave. In this case, however, the property of the parametron may be impaired by excessive heating thereof. It is possible to eliminate this defect by substantially stopping the shifting of the binary digital signals by carrying out rightward and leftward shifting alternatively.

The circuit in Fig. 5 has a further function as follows. Now, let it be assumed that the terminal pairs, $S_1$ and $S_2$, are supplied with binary phased signals and the amplitude of each of said signals is less than that of the phase control voltages which are supplied from the adjacent gate parametrons ($P_1$ and $P_3$ in case of the parametron $P_2$, and $P_4$ and $P_6$ in case of the parametron $P_5$) through coupling impedance Z. In this case, the operation of the circuit as shift register is carried out in the same manner as described above. When all the exciting waves, I, II and III, are stopped for a short time first, and then the exciting terminal pair $e_2$ is supplied with the exciting wave II, the oscillation phases of the gate parametrons, $P_2$, $P_5$ . . ., are controlled by the signal wave supplied to the terminal pairs, $S_1$, $S_2$ . . ., whereby signals of the terminal pairs, $S_1$, $S_2$, . . ., can be registered simultaneously in the shift register. Of course, it is possible to take out the registered signals of the shift register from the terminal pairs, $S_1$, $S_2$ . . . .

Since the circuit in Fig. 5 can make the parametron carry out gating action when oscillation of said circuit is suitably controlled by gating signals, it is possible to memorize binary digital signals without shifting, to shift said signals towards any direction, to send out said signals from the signal terminal pairs in parallel condition, or to lead said signals into the signal terminal pairs in parallel condition.

The shift register having such functions as described above can be used for various purposes in the electric computing apparatuses such as series-parallel conversion circuit which couples the parallel-type transmission buses, register, or memory devices with serial-type transmission buses, registers, or memory devices.

When such shift registers as shown in Fig. 5, number of said registers corresponding to $n$ figure places and number of the parametrons of said registers being $3n$, are connected in a ring form and the oscillation of the gate parametrons is controlled so that the registered signals may not be shifted in normal condition and may be shifted to the next stage on the right or left side only when a counting signal is applied, a ring counting circuit of radix $n$ is obtained.

Moreover, when the circuit is so designed that the registered signals are transmitted rightwards in case of additive counting signals and leftwards in case of subtractive counting signals, a reversible counting device capable of carrying out simultaneously the additive and subtractive counting is obtained.

As is clearly understood from the circuits in Figs. 4 and 5, by utilizing the above-mentioned gating action of the parametron, said action being caused by controlling the oscillation of the parametron by a gating signal, a circuit having very complicated functions can be obtained by using a small number of parametrons. However, when a circuit having the same functions as the above-mentioned circuit is composed of the parametrons which are excited with stationary exciting wave, it is necessary to use several times as many parametrons as in the above case. In this respect, this invention has a remarkable effect for simplifying the parametron circuits.

In the above embodiments, impedances Z connected in parallel to the resonance circuits of the parametrons are used for the coupling of the parametrons. However, since the coupling of the parametron is made for transmitting oscillation voltage from one parametron to another, any other coupling system such as the system utilizing series admittance, mutual inductance, transformer or nonlinear element (ref.: U.S. patent application Ser. No. 604,241, filed on August 15, 1956), may be used as well.

Since the gating action of this invention is carried out by controlling the oscillation of gate parametrons, it is necessary to provide suitable methods for controlling the oscillation of said gate parametrons in accordance with the gating signal. In one method, which has already been explained, the amplitude of the exciting current is controlled in an on-off manner by the gating signal. However, many other methods can be used for the same purpose; for instance, the D.C. bias current supplied to the exciting terminals, 1 and 1*a*, in Fig. 1A and Fig. 1B, the frequency of the exciting current, or the value of the damping resistor R in Fig. 1A and Fig. 1B, may be varied as well so as to break off the condition necessary to produce a parametric oscillation.

As means for attaining the above-mentioned methods, we can use the well-known modulators in which vacuum tubes, transistors, and rectifiers are utilized. However, when the life and the reliability of the circuit components are most important, the means described below seem preferable.

In the parametron device in which a stationary exciting system is used, it is necessary to control the excitation wave (having a frequency $2f$) of gate parametrons by using an oscillation wave (having a frequency $f$) of the parametrons as a gating signal. For the purpose of said control, control of the excitation wave can be carried out by a frequency converter capable of converting the oscillation wave having frequency $f$ into an exciting wave having a frequency $2f$. Examples of such frequency converters are illustrated in Figs. 6A and 6B. In Fig. 6A, the circuit comprises two ferro-magnetic cores, $F_1$ and $F_2$, provided, respectively, with primary and secondary coils, said coils being connected in the same manner as those in Fig. 1A. When the terminals, 4 and 4*a*, are supplied with D.C. bias and the terminals, 5 and 5*a*, are supplied with a signal current having frequency $f$, the second harmonic signal wave having frequency $2f$ is taken out from the terminals, 4 and 4*a*.

In Fig. 6B, in which the terminals similar to those of Fig. 6A are indicated by the same symbols, the circuit comprises two nonlinear capacitors, $C_1$ and $C_2$, made of ferro-electric material such as barium-titanate, and a transformer T. The capacitors are connected in series to the primary coil of said transformer. When the terminals, 4 and 4*a*, are supplied with D.C. bias and the terminals, 5 and 5*a*, are supplied with a signal wave having a frequency $f$, a signal wave having a frequency $2f$ is taken out from the terminals, 4 and 4*a*.

Figure 7:
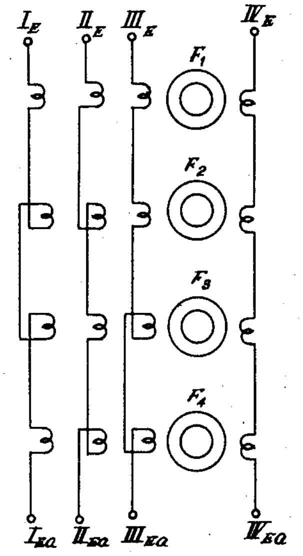
Fig. 7 is a circuit diagram of a still further embodiment of the gate circuit to be used for the system of this invention.

While the circuits in Figs. 6A and 6B are frequency doublers, the electric multiplier (ref.: U.S. patent application Ser. No. 579,572 filed on April 20, 1956), such as shown in Fig. 7 can be used as well. This electric multiplier comprises four nonlinear elements, for example ferro-magnetic cores, $F_1$, $F_2$, $F_3$ and $F_4$, and four terminal pairs ($I_E$, $I_{Ea}$), ($II_E$, $II_{Ea}$), ($III_E$, $III_{Ea}$) and ($IV_E$, $IV_{Ea}$).

When the terminal pairs ($I_E$, $I_{Ea}$), ($II_E$, $II_{Ea}$), and ($III_E$, $III_{Ea}$) are, respectively, supplied with currents, $I_1$, $I_2$ and $I_3$, is produced at the terminal pair ($IV_E$, $IV_{Ea}$) the following voltage $V_4$ proportional to the product of said currents:

$$V_4 = KI_1I_2I_3 \quad \text{(K is a constant)}$$

In the electric multiplier as described above, when the terminal pairs ($I_E$, $I_{Ea}$), ($II_E$, $II_{Ea}$) and ($III_E$, $III_{Ea}$) are, respectively, supplied with direct current $I_D$, oscillation current $I_f$ of the parametron and stationary current having frequency $3f$ or $f$, the voltage induced at the terminal pair ($IV_E$, $IV_{Ea}$) contains a component having a frequency $2f$. This component can be used as an exciting wave for the parametron.

All the frequency converters illustrated in Figs. 6A, 6B and Fig. 7 have a characteristic such that a signal having a frequency $2f$ can be taken out when a signal having frequency $f$ is supplied.

In Fig. 8 is illustrated an embodiment of the circuit which controls the excitation of the parametron by using such a frequency converter as described above. In Fig. 8, the device $C_0$ represents the frequency converter such as shown in Fig. 6A, Fig. 6B or Fig. 7. When the parametrons, $P_1$ and $P_2$, are made to oscillate by supplying said parametrons with phase control waves having the same phase at their input terminals, $E_1$ and $E_2$, a voltage having frequency $f$ is not produced at the terminal pair ($II_E$, $II_{Ea}$). Accordingly, no output voltage is produced at the terminal pair ($IV_E$, $IV_{Ea}$). In other words, the parametrons, $P_3$ and $P_4$, are not excited and do not oscillate. On the other hand, when the parametrons, $P_1$ and $P_2$, are, respectively, supplied with the phase control waves having phases differing by 180°, a voltage having a frequency $f$ is generated at the terminal pair ($II_E$, $II_{Ea}$) and a voltage having a frequency $2f$ is produced as an exciting wave at the terminal pair ($IV_E$, $IV_{Ea}$). Accordingly, the parametrons, $P_3$ and $P_4$, are made to oscillate.

While the example shows two gate parametrons $P_3$ and $P_4$, any number of said gate parametrons may of course be used. For the excitation of the parametrons, $P_1$ and $P_2$, either stationary or astationary exciting system may be used.

Since the frequency converters illustrated in Figs. 6 and 7 have the advantages that the cost is cheap and the life is semipermanent, said converters fit very well for the astationary exciting means of the parametrons.

The frequency doubler illustrated in Figs. 6A and 6B is simpler in construction than that of the electric multiplier illustrated in Fig. 7. On the other hand, the latter has the advantage that it has a considerable power gain and the phase of the output exciting wave having frequency $2f$ can be varied at will by adjusting the output phase of the oscillator having frequency $3f$ or $f$, because a pair of terminals is supplied with a current from a separate oscillator.

While particular embodiments of this invention have been described and shown, it will, of course, be understood that the invention would not be limited thereto, since many modifications may be made which are within the true spirit and scope of this invention.

What is claimed is:

1. In a gating arrangement for channel selecting circuits and shift register circuits for digital computing devices, in combination; at least one output parametrically excited resonator; at least two gating parametrically excited resonators; each of said resonators comprising an output resonant circuit having a resonance frequency $f$ and having means for varying the resonance frequency of said output resonant circuit, an exciting circuit for applying an exciting current of frequency $2f$, means coupling said exciting circuit to each of said output resonant circuits through said means for varying the resonance frequency to generate an oscillation having a frequency $f$ corresponding to a ½ subharmonic of said exciting frequency $2f$ and having one of two different phases which are displaced by 180 degrees from each other and representative respectively, of binary conditions "0" and "1," means for applying a weak control signal of frequency $f$ directly to said output resonant circuit, the phase of ½ subharmonic oscillation of frequency $f$ being controlled by the phase of said weak control signal when said ½ subharmonic oscillation is restarted after interruption; binary information sources each connected to each of said gating resonators; means for selectively applying an exciting current having a frequency $2f$ to said means for varying the resonant frequency of each one of said gating resonators to effect selective transmission of the binary information from a selected one of said information sources to said output parametrically excited resonator by selectively applying an exciting current to one of said gating resonators connected to said selected information source thereby controlling the oscillation phase of said one gating resonator slightly after said selective application of an exciting current to said one gating resonator to control the oscillation phase of said gating resonator connected to said selected information source; means coupling the gating resonators to said output parametrically excited resonator for applying the ½ subharmonic oscillation $f$ of the gating resonators to said output parametrically excited resonator as the weak control signal thereof.

2. In a gating arrangement for channel selecting circuits and shift register circuits for digital computing devices comprising, in combination, a plurality of gating resonant circuits and at least one gated resonant circuit each having a resonant frequency of near $f$ and each including an input, an output and a variable reactance the value of which is a parameter determining the resonant frequency of said resonant circuit, frequency doubling means coupling the outputs of the gating resonant circuits with the output of the gated resonant circuit for varying the parameter of said gated resonant circuit, means for varying said parameters of the gating circuits comprising at least two alternating power supply circuits each having a frequency $2f$ and a source of bias, and means applying said $2f$ frequency from said power supply circuits to said variable reactances of the gating resonant circuits to vary the values of said reactances and thereby generate in said resonant circuits parametric oscillations having a frequency $f$, said power supply circuits being coupled to said resonant circuits in balanced bucking relationship so that said frequency $2f$ of the power supply circuits is not transmitted to said resonant circuits and the frequency $f$ of said resonant circuits is not transmitted back to said power supply circuits, and means for gating each of said circuits for interrupting the oscillations of frequency $f$ in said gating circuits comprising means to apply a phase reference signal to the resonant output circuit of the gating parametrons and a different phase signal to the gating parametrons for causing the gating parametrons to have an output signal only when the different phase signal is applied, whereby the gated resonant circuit generates an output signal under control of said gating resonant circuit.

3. In a gating arrangement for channel selecting circuits and shift register circuits for digital computing devices comprising, in combination, a plurality of gating resonant circuits and at least one gated resonant circuit each having a resonant frequency of near $f$ and each including an input, an output and a variable reactance the value of which is a parameter determining the resonant frequency of said resonant circuit, frequency doubling means coupling the outputs of the gating resonant circuits with the output of the gated resonant circuit for varying the parameter of said gated resonant circuit, means for varying said parameters of the gating circuits comprising at least two alternating power supply circuits each having a frequency $2f$ and a source of D.C. bias, and means applying said $2f$ frequency from said power supply circuits to said variable reactances of the gating resonant circuits to vary the values of said reactances and thereby generate in said resonant circuits parametric oscillations having a frequency $f$, said power supply circuits being coupled to said resonant circuits in balanced bucking relationship so that said frequency $2f$ of the power supply circuits is not transmitted to said resonant circuits and the frequency $f$ of said resonant circuits is not transmitted back to said power supply circuits, and means for gating each of said circuits for interrupting the oscillations of frequency $f$ in said gating circuits comprising means to apply a phase reference signal to the resonant output circuit of the gating parametrons and a different phase signal to the gating parametrons for causing the gating parametrons to have an output signal only when the different phase signal is applied, whereby the gated resonant circuit generates an output signal under control of said gating resonant circuit.

4. In a gating arrangement for channel selecting circuits and shift register circuits for digital computing devices comprising, in combination, a plurality of gating resonant circuits and at least one gated resonant circuit each having a resonant frequency of near $f$ and each including an input, an output and a variable reactance the value of which is a parameter determining the resonant frequency of said resonant circuit, frequency doubling means coupling the outputs of the gating resonant circuits with the output of the gated resonant circuit for varying the parameter of said gated resonant circuit, means for varying said parameters of the gating circuits comprising at least two alternating power supply circuits each having a frequency $2f$ and a source of D.C. bias, and means applying said $2f$ frequency from said power supply circuits to said variable reactances of the gating resonant circuits to vary the values of said reactances and thereby generate in said resonant circuits parametric oscillations having a frequency $f$, and means for gating each of said circuits for interrupting the oscillations of frequency $f$ in said gating circuits comprising means to apply a phase reference signal to the resonant output circuit of the gating parametrons and a different phase signal to the gating parametrons for causing the gating parametrons to have an output signal only when the different phase signal is applied, whereby the gated resonant circuit generates an output signal under control of said gating resonant circuit.

5. In a gating arrangement for channel selecting circuits and shift register circuits for digital computing devices comprising, in combination, a plurality of gating resonant circuits and at least one gated resonant circuit each having a resonant frequency of near $f$ and each including an input, an output and a variable reactance the value of which is a parameter determining the resonant frequency of said resonant circuit, frequency doubling means coupling the outputs of the gating resonant circuits with the output of the gated resonant circuit for varying the parameter of said gated resonant circuit, means for varying said parameters of the gating circuits comprising at least two alternating power supply circuits each having a frequency $2f$ and a source of bias, and means applying said $2f$ frequency from said power supply circuits to said variable reactances of the gating resonant circuits to vary the values of said reactances and thereby generate in said resonant circuits parametric oscillations having a frequency $f$, and means for gating each of said circuits for interrupting the oscillations of frequency $f$ in said gating circuits comprising means to apply a phase reference signal to the resonant output circuit of the gating parametrons and a different phase signal to the gating parametrons for causing the gating parametrons to have an output signal only when the different phase signal is applied, whereby the gated resonant circuit generates an output signal under control of said gating resonant circuit.

6. In a gating arrangement for channel selecting circuits and shift register circuits for digital computing devices comprising, in combination, a plurality of gating resonant circuits and at least one gated resonant circuit each having a resonant frequency of near $f$ and each including an input, an output and a variable reactance the value of which is a parameter determining the resonant frequency of said resonant circuit, frequency doubling means coupling the outputs of the gating resonant circuits with the output of the gated resonant circuit for varying the parameter of said gated resonant circuit, means for varying said parameters of the gating circuits comprising at least two alternating power supply circuits each having a frequency $2f$ of bias, and means applying said 2f frequency from said power supply circuits to said variable reactances of the gating resonant circuits to vary the values of said reactances and thereby generate in said resonant circuits parametric oscillations having a frequency $f$, said power supply circuits being coupled to said resonant circuits in balanced bucking relationship so that said frequency $2f$ of the power supply circuits is not transmitted to said resonant circuits and the frequency $f$ of said resonant circuits is not transmitted back to said power supply circuits, and means for gating each of said circuits for interrupting the oscillations of frequency $f$ in said gating circuits comprising means to apply a phase reference signal to the resonant output circuit of the gating parametrons and a different phase signal to the gating parametrons for causing the gating parametrons to have an output signal only when the different phase signal is applied, whereby the gated resonant circuit generates an output signal under control of said gating resonant circuit.

7. In a gating arrangement for channel selecting circuits and shift register circuits for digital computing devices, in combination, at least one output parametron, at least two connected gating parametrons connected in cascade with said output parametron for controlling the output of said output parametron, said gating parametrons each comprising a resonant output circuit having means connected for generating in operation an output oscillation signal having a predetermined resonance frequency and one of two different predetermined phases with a phase displacement of 180 degrees from each other with said phases corresponding to conditions "0" and "1," means for selectively applying to the resonant circuit of each gating parametron an exciting signal having a frequency of twice the resonance signal, means in each gating parametron for coupling said exciting signal applying means to the resonant output circuit, means for applying a phase reference signal to the resonant output circuit of each gating parametron to determine the conditions, "0" and "1," of the output oscillation to allow generation of the output oscillations of the gating parametrons only when a signal having an opposite phase is applied thereto, said phase reference signal having a selected phase, means coupling the resonant circuits of the gating parametrons to the output parametron for selectively applying double the frequency of the output signal of the two gating parametrons to the output parametron comprising an output resonant circuit connected to said coupling means and responsive to said output control signal for generating an output oscillation signal having a predetermined frequency and one of two different phases with a phase displacement of 180 degrees from each other in dependence upon the phase of the output control signal, said two different phases corresponding to conditions "0" and "1," and means for selectively applying a gating signal having an opposite phase from the phase of the reference signal to the resonant circuit of the individual gating parametrons individually and simultaneously to cause them to generate an output signal and thereby apply their output signals to the output parametron causing it to generate its output signal under control of said gating parametrons.

8. In a gating arrangement for channel selecting circuits and shift register circuits for digital computers according to claim 7, in which said means coupling the resonant circuits of the gating parametrons to the resonant circuit of the output parametron comprise means for doubling the frequency of the output signal of the gating parametrons and for applying the doubled frequency signal as an exciting signal applied to the resonant circuit of the output parametron as a gating signal.

9. In a gating arrangement for channel selecting circuits and shift register circuits for digital computers according to claim 8, in which said frequency doubling means comprises a frequency doubler circuit.

10. In a gating arrangement for channel selecting circuits and shift register circuits for digital computers according to claim 8, in which said frequency doubling means comprises a frequency converter.

References Cited in the file of this patent

UNITED STATES PATENTS

| | | |
|---|---|---|
| 2,709,757 | Triest | May 31, 1955 |
| 2,721,947 | Isborn | Oct. 25, 1955 |
| 2,770,739 | Grayson | Nov. 13, 1956 |
| 2,775,713 | Isborn | Dec. 25, 1956 |